Sept. 26, 1961 F. L. ZYBACH 3,001,721
SELF-PROPELLED SPRINKLING IRRIGATION APPARATUS
Filed June 24, 1957 8 Sheets-Sheet 1
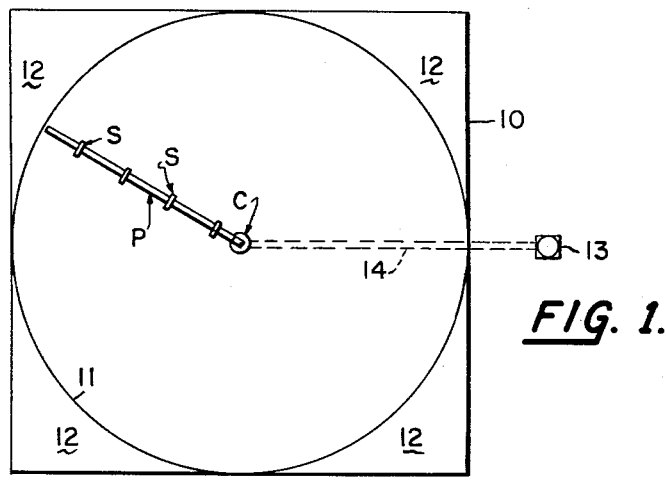
FIG. 1.
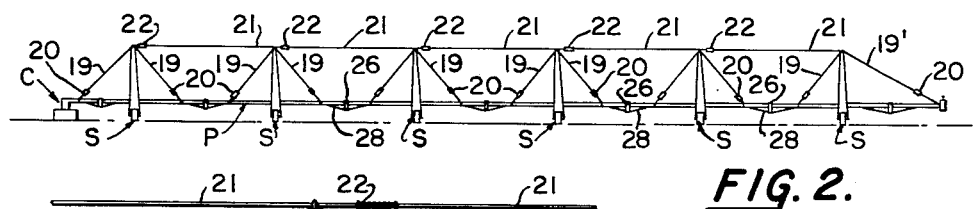
FIG. 2.
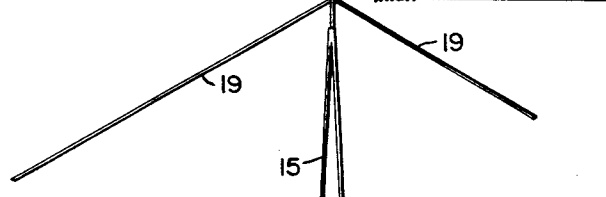
FIG. 3.
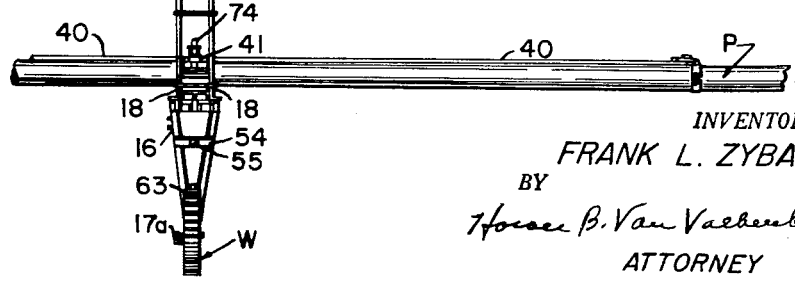
INVENTOR.
FRANK L. ZYBACH
BY
Horace B. Van Valkenburgh
ATTORNEY Sept. 26, 1961  F. L. ZYBACH  3,001,721
SELF-PROPELLED SPRINKLING IRRIGATION APPARATUS
Filed June 24, 1957  8 Sheets-Sheet 2

INVENTOR.
FRANK L. ZYBACH
BY
ATTORNEY

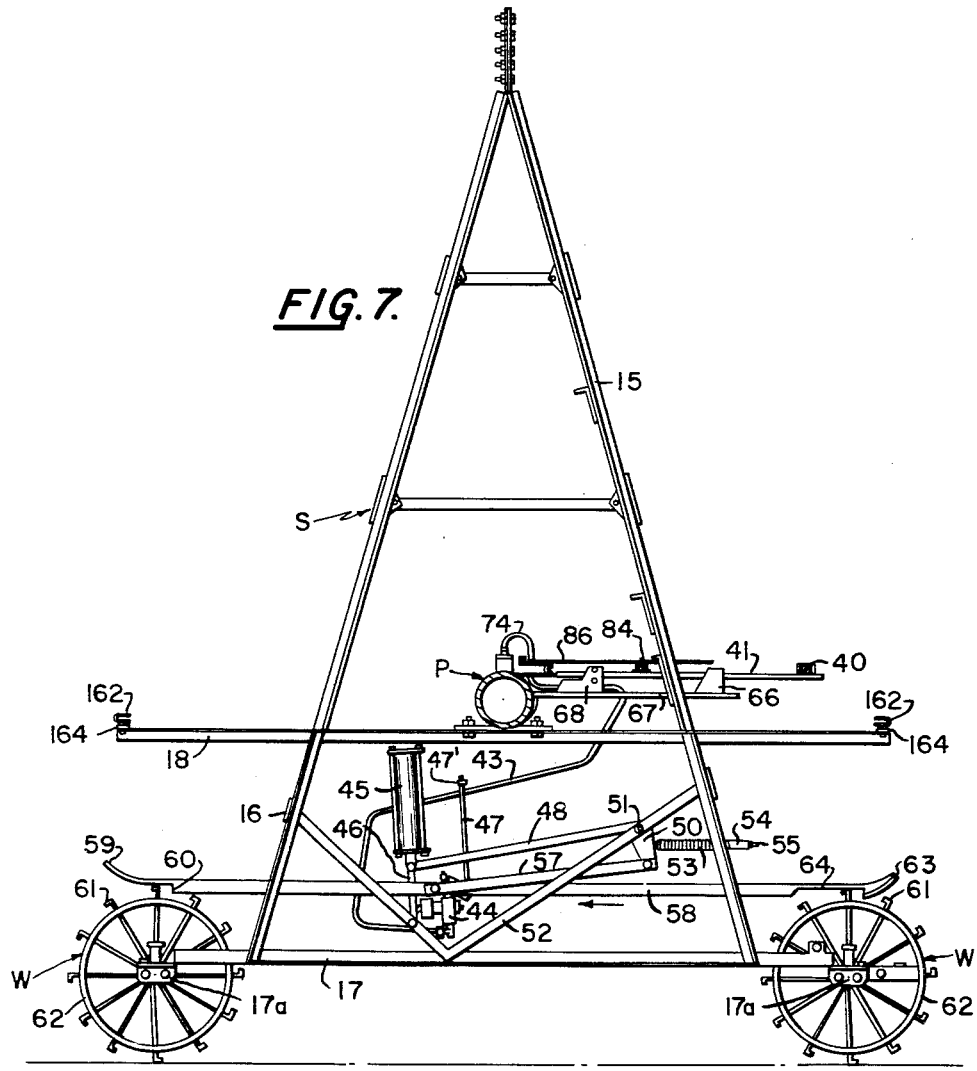

Sept. 26, 1961 F. L. ZYBACH 3,001,721
SELF-PROPELLED SPRINKLING IRRIGATION APPARATUS
Filed June 24, 1957 8 Sheets-Sheet 4

INVENTOR.
FRANK L. ZYBACH
BY
Horace B. Van Valkenburgh
ATTORNEY

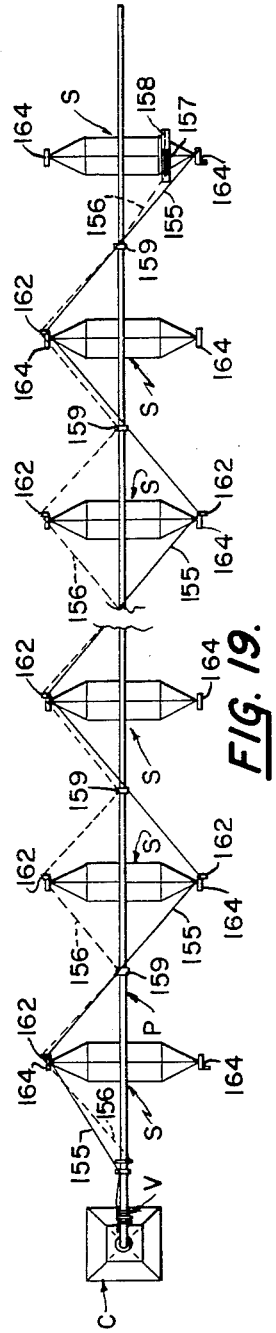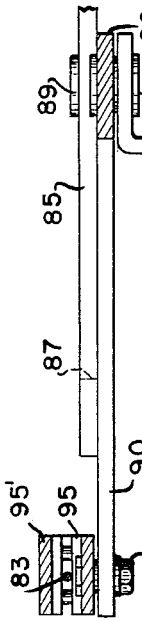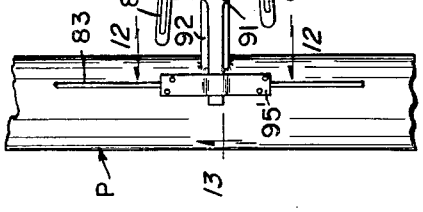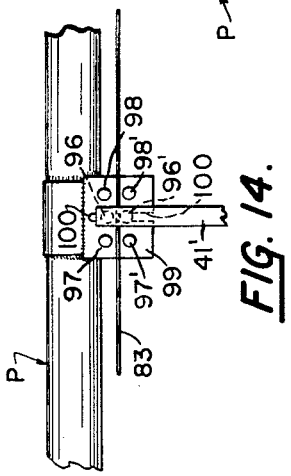

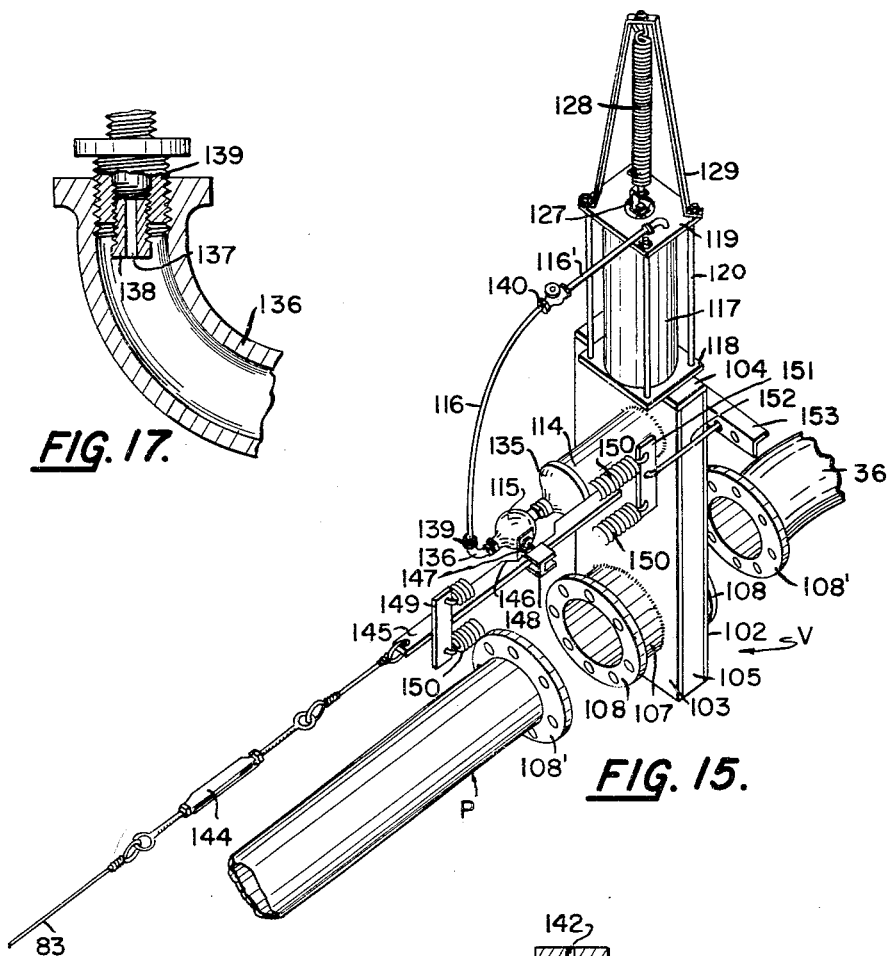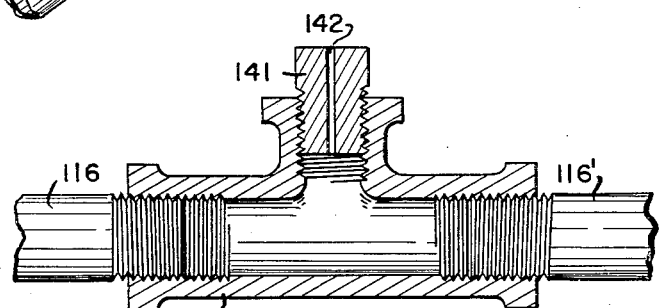

Sept. 26, 1961 F. L. ZYBACH 3,001,721
SELF-PROPELLED SPRINKLING IRRIGATION APPARATUS
Filed June 24, 1957 8 Sheets-Sheet 7

INVENTOR.
FRANK L. ZYBACH
BY
Horace B. Van Valkenburgh
ATTORNEY

Sept. 26, 1961  F. L. ZYBACH  3,001,721
SELF-PROPELLED SPRINKLING IRRIGATION APPARATUS
Filed June 24, 1957  8 Sheets-Sheet 8

INVENTOR.
FRANK L. ZYBACH
BY
Horace B. Van Valkenburgh
ATTORNEY

United States Patent Office 3,001,721
Patented Sept. 26, 1961

3,001,721
SELF-PROPELLED SPRINKLING IRRIGATION
APPARATUS
Frank Louis Zybach, 1471 18th Ave., Columbus, Nebr.
Filed June 24, 1957, Ser. No. 667,585
25 Claims. (Cl. 239—177)

This invention relates to a sprinkling and irrigation apparatus, and more particularly to self-propelled apparatus for sprinkling or irrigating comparatively large sections of land. The present invention is an improvement upon the self-propelled sprinkling irrigating apparatus of my U.S. Patent 2,604,359, granted July 22, 1952, and is related to my copending application Serial No. 361,808, filed June 15, 1953, now Patent No. 2,941,727.

Certain of the problems involved in irrigating, by sprinkling, comparatively large sections of land are discussed in my above patent and copending application and each discloses a comparatively long distributing pipe, generally formed by sections connected together, which is mounted on a series of spaced supports adapted to move the pipe along or around a field, the latter about a centrally located point as an axis. The distributing pipe may be provided with a series of spaced nozzles, for discharging sprays of water onto the land as the pipe is moved along or around its path, while the water supplied by the distributing pipe is conveniently also utilized to actuate a water motor at each support for driving the same. Control of the speed of each water motor may be provided by connecting a movable element to a valve which controls the supply of water to the water motor. If individual electric motors are provided at the respective supports, such movable element may be connected to a rheostat or other control device, while if a single electric motor is provided with a drive shaft extending parallel to the distributing pipe and connected to a transmission at each support, such movable element may be connected to a suitable lever or other device for controlling a variable speed transmission. Such movable control element may be actuated by rods, wires or the like, connected to the distributing pipe at one or both sides of a support, so as to be responsive to the springing or bending of the distributing pipe, which takes place when one of the supports moves ahead or behind an adjacent support. Conveniently, the drive motor or drive means for the outermost support is set to provide the desired rate of travel, while the remaining supports may be automatically controlled in the above manner so as to be kept in alignment with the outer support. The supports conveniently comprise wheeled carriages, with the wheels disposed on opposite sides of the distributing pipe and adapted to follow the same track, so as to minimize the portion of the crop which will be prevented from growth due to movement of the apparatus along or around the field.

It may happen that one or more of the supports proceeds too far ahead or behind adjacent supports to permit the automatic speed control to cause such support to return to its proper position, as through breakage or temporary inoperativeness of working parts, obstructions in the field or the like. If movement of the apparatus is continued, after one or more of the supports is too far ahead or behind adjacent supports to permit the automatic control to correct misalignment of the supports, danger of damage to the distributing pipe or other parts of the apparatus is imminent. Thus, it is better to stop the device entirely than to permit such damage to occur, since such apparatus is normally adapted to be operated 24 hours a day, perhaps for several days or weeks at a time, without constant supervision and such danger of damage may occur at inopportune times, such as during the early morning hours when there will normally be no one near to observe the misalignment. Of course, there may be situations which are only temporary, such as when one of the supports is running down a corn hill and therefore tends to move further ahead than normally permitted by the automatic control, or when irregularities in the ground, such as a dip, rise or swell are encountered and which are not sufficient in magnitude to ultimately produce damage, providing the automatic controls operate to correct the misalignment within a reasonable time.

When undue misalignment of one or more supports relative to an adjacent support occurs, the entire apparatus may be stopped, as by installing an electrical switch at each of the control supports and thereby stopping the pump which supplies the water to the distributing pipe, which will also cause the water motor to be stopped, as disclosed and claimed in my copending application Serial No. 361,808. Also, if an electric motor or motors are used to drive the apparatus, such motors may also be stopped by such electrical switches. However, the complications involved in supplying electricity for such switch controls, including the burying of wires alongside the pipe which carries water to the central axis of the apparatus and stringing electrical wires along the distributing pipe and a rotatable electrical connection at the axis of the distributing pipe renders such electrical control inconvenient to install and maintain, as well as sometimes unsatisfactory in operation, although these problems are no greater than the problems involved in furnishing electricity to the apparatus for an electric motor or motors when the latter are used to drive the apparatus. Such unsatisfactory operation of an electrical control system may be due to accidental displacement or breakage of the lead wires, shorts which may occur due to the constant wetting from the spraying nozzles, and the like. Thus, there appears to be room for improvement in the control mechanism by which the entire apparatus may be stopped when undue misalignment occurs.

A relatively long distributing pipe, such as 1320 feet long for irrigating by sprinkling a quarter section of land if made sufficiently light that the weight to be moved is not unduly great, necessarily is relatively thin-walled and therefore is reasonably flexible but also requires adequate support between the wheeled carriages. By suitable wires and bracing as well as a tower at each wheeled carriage or support, such a pipe may be supported so that the wires and bracing resist the stresses normally occurring. However, when such apparatus is passing over irregular land, there may be a tendency for one or more of the towers to tip in one direction or another, thereby tending to cause excessive stress to be placed on the distributing pipe. In addition, there is always the possibility of improvement in the controls for a water motor where utilized, as well as in the various other parts of such apparatus.

Among the objects of the present invention are to provide a novel self-propelled sprinkling irrigation apparatus; to provide such apparatus which will be shut down whenever undue misalignmnet of the various supports or wheeled carriages occurs; to provide novel control elements and devices for stopping operation of the apparatus upon such undue misalignment; to provide such control devices and elements which may exist in several different forms; to provide improvements in the control mechanism for a water motor, which may drive a wheeled carriage of such apparatus; to provide improvements in the drive connection between a reciprocating water motor and the drive wheels; and to provide such apparatus and such improvements therein which may be readily manufactured and will be effective and efficient in operation.

Additional objects and the novel features of this invention will become apparent from the description which follows taken in connection with the accompanying drawings, in which:

FIG. 1 is a diagram, on a considerably reduced scale, of a field to be irrigated by sprinkling and in which is installed apparatus constructed in accordance with this invention;

FIG. 2 is a front elevation, on a reduced scale, of a distributing pipe and the supports or wheeled carriages therefor;

FIG. 3 is an end elevation of one of the wheeled carriages or support units of FIG. 2, on a larger scale than FIG. 2;

FIG. 7 is a side elevation of the wheeled carriage or supporting unit of FIG. 3, on a slightly larger scale;

FIG. 11 is a top plan view of the parts associated with a safety control wire and actuated by the operating bar for the water motor control of FIGS. 8 and 9;

FIG. 12 is an enlarged vertical section, taken along line 12—12 of FIG. 11;

FIG. 13 is an enlarged vertical section, taken along line 13—13 of FIG. 11;

FIG. 14 is a fragmentary top plan view, on a slightly reduced scale, of an alternative control arrangement for a safety control wire;

FIG. 15 is an exploded perspective view of a safety control shutoff valve, installed in the distributing pipe, and certain parts associated therewith;

FIG. 17 is an enlarged longitudinal section of an orifice control for the shutoff valve of FIG. 15;

FIG. 18 is an enlarged longitudinal section of a bleed orifice utilized in conjunction with the shut-off valve of FIG. 15;

FIG. 19 is a condensed top plan view of the apparatus, illustrating an alternative control wire arrangement for a safety shut off valve;

Figure 4:
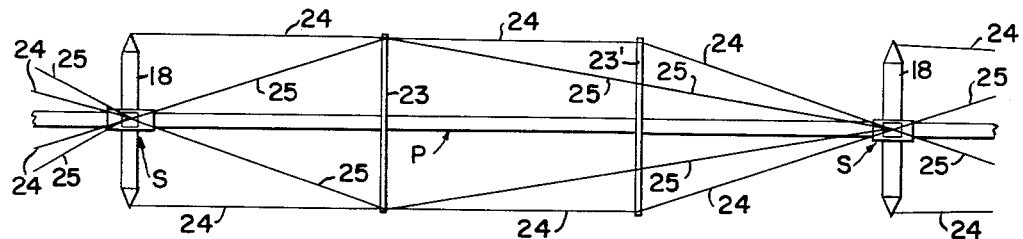
FIG. 4 is a diagrammatic top plan view of a portion of the apparatus, between two adjacent supports or carriages, illustrating particularly the horizontal wires and bracing which may extend between the supports and to the distributing pipe.

As illustrated in FIGS. 1 and 2, a relatively long distributing pipe P may be mounted on a series of supports S for rotation about a central structure C, located at approximately the center of a field 10 to irrigate by sprinkling the land enclosed within a circle 11. Suitable provision may be made, such as in the manner disclosed in my U.S. Patent No. 2,604,359, for sprinkling or irrigating the corners 12 of the field, while the water may be supplied from a well or other suitable source, such as located in the field or exteriorly of the field as at a pump house 13. The water may be conveyed from pump house 13 to central structure C through a pipe 14, preferably buried in field 10 so that supports S may move thereover during rotation around the field. Distributing pipe P may be provided with spaced, conveniently conventional, sprinkling nozzles, preferably of the swinging type which automatically reciprocate through an arc of a sufficinet number of degrees that the entire area behind the pipe, for instance, will be covered. Since outer portions of the pipe P will travel at a faster rate than inner portions, the sprinkling nozzles are preferably graduated in size so that a successively greater amount of water will be discharged through the sprinkling nozzles from the inner to the outer end of pipe P. It will be understood, of course, that the pipe P may be run along the field, rather than around in the field, in which event the sprinkling nozzles may all be of approximately the same size. The capacity of the well or other source of water, as at the pump house 13, need not be relatively great, since the apparatus may be set to rotate around the field once every ten to twenty-four hours and a flow of 200 to 500 gallons a minute is normally sufficient. The supports S are spaced appropriate distances apart, such as 200 feet, while the pipe P may be formed from flanged sections connected together, each section being of a conventional length, such as thirty feet.

Each support S, as in FIG. 3, may include a tower having an upper section 15 formed from angles or other suitable structural members, diverging from the top downwardly to a lower section 16, the upper section 15 appearing as triangular when viewed from either the end, as in FIG. 3, or from the side, as in FIG. 7, and a lower section 16 appearing inverted triangular when viewed from the end, as in FIG. 3, and trapezoidal when viewed from the side, as in FIG. 7. A drive wheel W, conveniently constructed in a manner described later, may be mounted at each side of each support S, on an offset bracket 17a extending from a beam 17 which forms the base of the tower, while pipe P may be mounted on a pair of beams 18 which extend past the tower at each side, for a purpose described later. As illustrated in FIGS. 2 and 3, the tops of the towers may be connected to pipe P at each side of a support by a slanting cable 19 having interposed therein a heavy coil spring 20, the cable 19' extending from the top of the outermost tower to the end of the pipe P conveniently being spaced a greater distance from the outermost support. Also, the tops of the towers may be connected by horizontal cables 21, having interposed therein heavy coil springs 22. The coil springs 20 and 22 permit adjacent towers to move away from each other, as when the pipe P is passing over a hill or rise, to avoid undue stress on pipe P and parts associated therewith. As will be evident, pipe P, being preferably comparatively thin-walled and also light in weight, has sufficient flexibility to accommodate such movement of the towers as the pipe passes over a small hill or rise, but insufficient strength to hold up one of the supports S, in the event that the springs 20 and 22 are not provided and one of the supports tends to be lifted bodily off the ground by passage over the small hill or rise. In addition, the coil springs 22 will permit the pipe P and supports S to accommodate themselves more readily to movement over a depression or hollow in the ground, particularly intermediate the ends of the apparatus.

Figure 5:
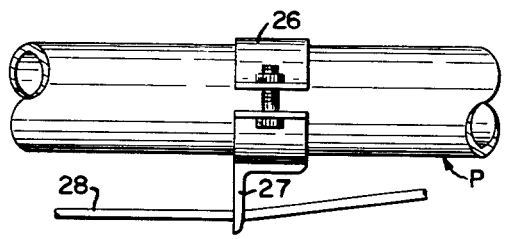
FIG. 5 is a fragmentary side elevation on an enlarged scale of a portion of additional bracing for the distributing pipe.

As shown in FIG. 4, the pipe P may be reinforced by horizontal wires and bracing, such as including cross braces 23 and 23' spaced equidistantly between two of the supports S and mounted on pipe P in any suitable manner, as by a clamp, so as to extend forwardly and rearwardly of the pipe. An outer wire 24 may extend from each outer end of the beam 18 to the end of the cross brace 23, thence to the end of the cross brace 23' and then to the center of the next inwardly disposed support S. An inner wire 25, at each side, may extend from the center of one support S to the outer end of the cross brace 23 and then to the center of the next inwardly disposed support S. In addition, as shown in FIGS. 2 and 5, a clamp 26 having a depending flange 27 may be mounted on pipe P, at a position centrally of the points of attachment of the cables 19, and a truss rod 28 may extend through flange 27 on the underside of pipe P and may be attached to each of the clamps or the like by which cables 19 are attached to the pipe, or the pipe couplings at which the cables may be attached, as in FIG. 6, it being understood that the ends of truss rods 28 are conveniently attached on the underside of the pipe and the cables 19 at the top of the pipe. As will be evident, the combination of cables 19 and the truss rod 28 supports pipe P against downward displacement, between each pair of adjacent supports S, while the cross braces 23 and 23' and the wires 24 and 25 maintain lateral stability of the pipe.

Figure 6:
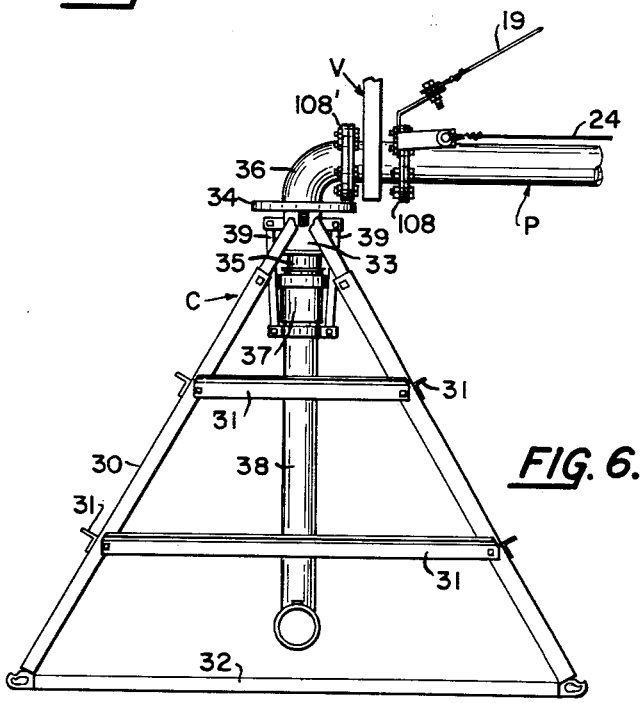
FIG. 6 is a side elevation on an enlarged scale of the structure which may be placed at the pivot point or axis of rotation of the distributing pipe.

The central structure C, as in FIG. 6, may be pyramidal in shape and formed of structural members, such as slanting members 30, conveniently angles, which extend along each of the corners and horizontal bars 31, such as also structural angles, to reinforce the members 30. Tubular members 32, such as pipes, may extend along two sides of the base of the pyramid, between the lower ends of adjacent pairs of the members 30. The central structure C supports a bearing collar 33 provided with a safety flange 34 and through which may extend a short pipe 35 connected to one side of an L 36, the opposite side of L 36 being connected to the inner end of the distributing pipe P and pipe 55 extending into a sealing sleeve 37 mounted on the upper end of a vertically disposed, stationary water pipe 38, held in position by clamps supported by brackets 39. Suitable sealing means is provided between the rotating lower end of pipe 35 and sleeve 37, while pipe 35 may be provided with an integral expansion joint to accommodate temperature changes. The length of pipe 38 may be varied so that the lower end of pipe 38 may be adjusted upwardly or downwardly as required, for connection to the pipe 14 of FIG. 1, which may emerge from the ground at a point inwardly of the innermost support S, if desired.

As illustrated in FIGS. 3 and 7, a pair of horizontal control rods 40 may be attached to pipe P at a suitable distance from each of the supports S, except the outermost support, which may be set for movement at a desired rate, as indicated previously, and therefore need not be provided with an automatic speed control mechanism. The opposite ends of rods 40 may be connected together and to the outer end of a horizontal control bar 41 which is moved inwardly or outwardly, relative to the center of the support S, in accordance with the springing or bending of pipe P at or adjacent the support, whenever the particular support moves ahead or behind either or both of the adjacent supports. Control bar 41, as explained later in connection with FIGS. 8 and 9, controls the degree of opening of a valve 42 (see FIG. 8), supplied with water from the distributing pipe P and from which a hose 43 of FIG. 7 leads to a water motor control valve 44, which may be constructed in the manner described in my copending application Serial No. 361,808. The water motor may include a cylinder 45 having therein a piston connected to the inner end of a hollow piston rod 46, which is supplied with water through the valve 44, valve 44 acting to close a discharge outlet during a predetermined period of time, so that water will be supplied to the interior of cylinder 45 above the piston until an upper stop 47' on a rod 47 is engaged by a lever 48, pivotally connected at one end to the bottom of cylinder 45. When rod 47 is thus pulled upwardly, valve 44 opens the discharge outlet, so that water will drain from the cylinder, through the hollow piston rod 46, and cylinder 45 will be permitted to move downwardly until a lower stop on rod 47 is engaged by the underside of lever 48 to cause valve 44 to close the discharge outlet and again permit cylinder 45 to be moved upwardly. Thus, the cylinder 45, the piston therein and hollow piston rod 46 may be constructed and associated with valve 44 in the manner described in my aforesaid application Serial No. 361,808.

In accordance with the present invention, lever 48 may be provided with a block 50 attached and extending at right angles thereto, the lever and block being pivotal about a pin 51 extending between a pair of struts 52 which form part of the structural framework of the support S. A coil spring 53 may be connected between block 50 and a bracket 54 mounted on the framework of the support S, spring 53 conveniently being connected to a stud 55 which extends through bracket 54 to provide, as by a nut on stud 55, a tension adjusting device, although any other suitable tension adjusting device may be utilized. As will be evident, when cylinder 45 moves upwardly, spring 53 will be extended and when cylinder 45 starts to move downwardly, the force of spring 53 will assist the cylinder 45, lever 48 and the remainder of the drive assembly, described below, back to position for the next driving movement. For lateral stability, lever 48 may be dual, i.e., one lever on each side of piston rod 46, while two blocks 50 and springs 53 may similarly be provided.

The extending end of block 50 may be pivotally attached to one end of a link 57, the opposite end of which is pivotally connected to a wheel driving arm 58 which is reciprocated in accordance with the movement imparted to lever 48 from the movement of cylinder 45. One outer end 59 of arm 58 may be upturned and a shoulder 60 disposed inwardly therefrom, the upturned end 59 being adapted to slide over a laterally disposed bar 61 with the bars 61 being attached to the rim 62 of a wheel W and the shoulder 60 being adapted to engage each bar 61, in turn, to turn wheel W in a forward direction, while the upturned end 59 maintains the shoulder 60 in position to engage the next bar. At its opposite end, arm 58 may be provided with an arcuate block 63, the inner end of which is adapted to engage the bars 61 on the opposite wheel W, in turn, while an adjacent narrow section 64 of arm 58, conveniently provided inwardly of the block 63, will ride over the uppermost bar 61, when arm 58 is moving rearwardly, i.e., while the cylinder 45 is moving downwardly. In the position shown in FIG. 7, cylinder 45 is starting up, while arm 58 is thus beginning movement in the direction of the arrow, the shoulder 60 thus being about to engage the uppermost bar 61 of wheel W, at the left, and the inner end of block 63 being about to engage the uppermost bar 61 of the wheel W, at the right.

Figure 8:
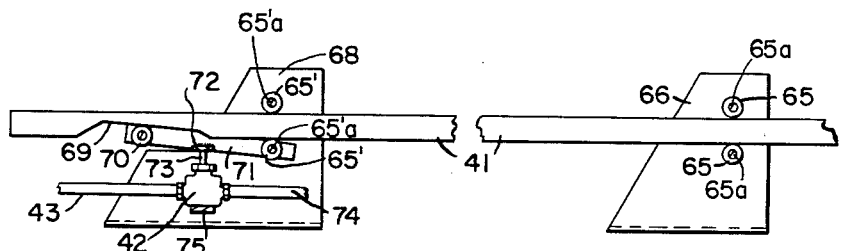
FIG. 8 is an enlarged, condensed section, taken transversely to the distributing pipe, of a portion of the control for a water motor.
Figure 9:
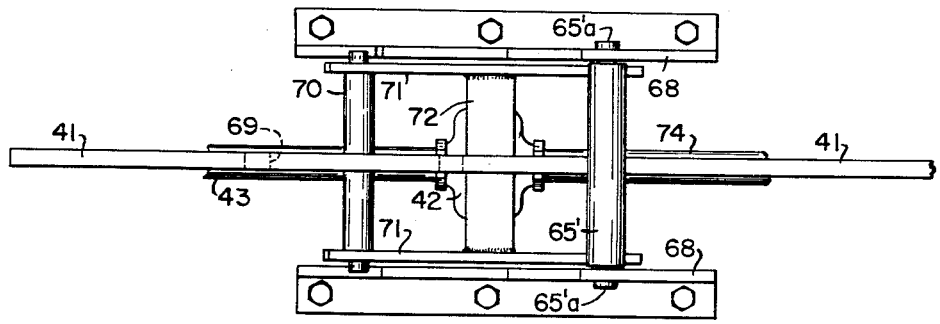
FIG. 9 is a top plan view, on a larger scale, of a portion of the water motor control shown in FIG. 8.

As illustrated in FIG. 7, and particularly in FIGS. 8 and 9, the horizontal control bar 41 may be guided in its movement by a pair of rollers 65, mounted on pins 65a extending between a pair of brackets 66, mounted adjacent one edge of the framework on a bar 67 extending from pipe P through the framework 15 and attached to each, and a pair of rollers 65', mounted on pins 65'a extending between a pair of brackets 68, mounted on bar 67 adjacent pipe P. As will be evident, rollers 65 and 65' prevent upward or downward deflection of control bar 41. Adjacent its inner end, the underside of control bar 41 may be cut away to form a cam surface 69 engaging a roller 70, which may extend between a pair of arms 71 pivoted at their inner ends on the pin on which the lower roller 65' is mounted. A bar 72 also extends between the arms 71 for engagement with a stem 73 of valve 42, supplied with water by a hose 74 leading from distributing pipe P and from which hose 43 extends to the water motor control valve 44, as indicated above. Valve 42 may be mounted on a bar 75 extending between brackets 68 and is preferably of a type in which stem 73 is pushed inwardly to open the valve and the stem is actuated by a spring when the stem 73 is permitted to move outwardly to close the valve. The cam surface 69 may be so proportioned that the valve is opened or closed to a greater or lesser extent relatively gradually upon corresponding movement of control bar 41. Of course, numerous variations in the configuration of cam surface 69 may be used. In any event, whenever the support involved moves ahead of one or both of the adjacent supports, due to the springing or bending of the pipe and resultant movement of control bar 41, the valve 42 will be moved toward closed position to permit the supports on each side to catch up, while whenever the particular support involved moves behind either or both of the adjacent supports, valve 42 will be moved toward open position to cause the particular support involved to be sped up, so as to catch up with the supports on either or both sides.

Figure 10:
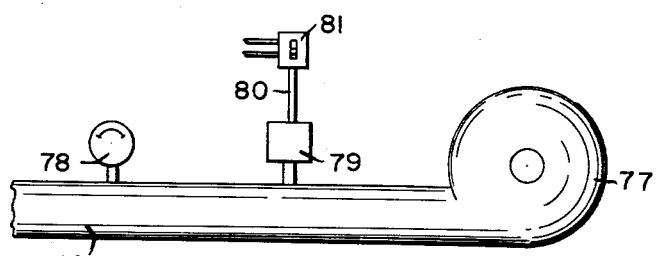
FIG. 10 is a side elevation of a main supply pump and a pressure control arrangement associated therewith, the latter acting in conjunction with certain other parts as a safety device.

In accordance with the present invention, in the event of undue misalignment of one or more supports relative to adjacent supports, a shutoff valve V installed in distributing pipe P adjacent the central structure C, as in FIG. 6, may be used to stop the flow of water through the distributing pipe and build up the pressure at the pump, as in the pump house 13 of FIG. 1, to cause suitable pressure responsive means installed in the pump house to become operative. Thus, as illustrated in FIG. 10, a pump 77 installed in the pump house 13 of FIG. 1, may be connected to pipe 14 and be driven by a conventional electric motor (not shown). Adjacent pump 77, a pressure gage 78 may be installed in pipe 14, for use not only in determining whether or not the pressure is adequate to drive each of the water motors at the support and also to provide sufficient water to supply all of the spray nozzles mounted on distributing pipe P, but also to adjust the safety mechanism which includes the shutoff valve V. The safety mechanism may also include a suitable pressure responsive device 79 connected to pipe 14 adjacent pump 77, conveniently constructed in a manner similar to a conventional relief valve, that is, operative whenever the pressure in pipe 14 exceeds a predetermined amount. When actuated, pressure responsive device 79 is adapted to move a rod 80 connected to a control switch 81 for the electric motor driving pump 77, to stop the pump motor. As will be evident, during the normal flow of water through pipe 14 and thence through distributing pipe P to the various spray nozzles and the water motors, the flow of water through pipe 14 will cause the pressure therein to be reduced, so that pressure responsive device 79 will not be actuated as long as the flow continues. Thus, pressure responsive device 79 may be adjusted to actuate rod 80 when the pressure in pipe 14 exceeds, as by 5 to 10 pounds per square inch, the pressure normally in pipe 14, i.e., when a full flow of water takes place. However, when valve V of FIG. 6 is closed, a pressure head will be built up in pipe 14 until the pressure reaches that for which device 79 is set, whereupon switch 81 will be moved to its off position and the motor driving pump 77 will be stopped. Of course, when valve V is closed, the supply of water to the spray nozzles and particularly to the water motors will be terminated, so that the apparatus rotating in the field will be stopped, but it is undesirable to continue operation of pump 77 when the apparatus is stopped.

The safety control mechanism at each of the supports S, except the outermost which determines the rate of movement around the field and therefore need not be controlled in accordance with the springing or bending of the distributing pipe P, may be actuated by the control bar 41 which normally controls the water supply valve 42 for the water motors, as described above. Thus, as in FIGS. 11-13, the control bar 41 may, through suitable mechanism, pull or push a safety control wire 83 so as to cause valve V to be closed upon undue misalignment at any of the supporting structures S, wire 83 preferably extending along pipe P from the outermost support S to valve V and adapted to cause the latter to close in a manner described later. At each of the supports S inwardly from the outermost support, a transverse bar 84 may be attached to control bar 41 and extend to either side thereof for pivotal attachment of slotted links 85 and 86, link 85 being provided with a slot 87 which is disposed further inwardly than slot 88 in link 86, for a purpose described below. Slot 87 may engage a pin 89 mounted on one transverse arm of a T-shaped bar 90 and slot 88 may engage a pin 89' mounted on the opposite transverse arm of bar 90. Bar 90 may be pivoted on a pin 91, mounted on a bracket 92 which, as in FIG. 13, may in turn be mounted on a bracket plate 93, conveniently welded to the distributing pipe P. It will be noted that the brackets 68 of FIGS. 8 and 9 may occupy a position between links 85 and 86, but are omitted from FIG. 11 for clarity of illustration. The longitudinal arm of T-bar 90 may, as is FIGS. 12 and 13, be pivotally attached, as by a bolt 94, to the lower of a pair of clamps 95 and 95' which may be bolted together, as shown, to clamp wire 83 therebetween and may be provided with a centrally offset portion to accommodate the head of bolt 94, as in FIG. 12. As will be evident, whenever control bar 41 is moved a predetermined distance toward pipe P, due to the particular support S moving an undue distance behind either or both of the adjacent supports, accompanied by the springing or bending of pipe P at the support involved, the end of slot 87 remote from pipe P will engage pin 89 and cause T-bar 90 to pivot in a counterclockwise direction, as viewed in FIG. 11, thus producing a lateral twist in wire 83. This shortens the effective length of the wire and thereby actuates the safety shutoff valve V in a manner described later. Also, if the control lever 41 should move away from pipe P an undue amount, occasioned by the particular support involving moving an undue distance ahead of either or both of the adjacent supports, accompanied by springing or bending of pipe P at the support involved, the end of slot 88 adjacent pipe P will engage pin 89' to cause T-bar 90 again to pivot in a counterclockwise direction, as viewed in FIG. 11, thus again producing a lateral twist in wire 83. This again shortens the effective length of wire 83, so that the safety shutoff valve V will again be actuated. It will be evident that the position of links 85 and 86 may be reversed, so that the T-bar 90 will be caused to pivot in a clockwise direction whenever control bar 41 is moved inwardly or outwardly an undue amount with respect to pipe P.

The effective length of wire 83 may also be shortened in any other suitable manner, as by the arrangement illustrated in FIG. 14, in which wire 83 passes between a pair of depending pins 96 and 96' mounted on the end of control bar 41', which may otherwise be similar to control bar 41. Wire 83 may also pass between a pair of spaced pins 97 and 97' at one side and a pair of spaced pins 98 and 98' at the other side of control bar 41', the pins 97, 97' and 98, 98' conveniently being upstanding from a bracket 99, attached to pipe P in any suitable manner, as by welding. As will be evident, in the event that control bar 41' moves inwardly in a direction toward pipe P, pin 96' will engage wire 83 and move the wire against pins 97 and 98 and upon further inward movement will push wire 83 between pins 97 and 98 to shorten the effective length of wire 83 and actuate the safety shutoff valve V. Similarly, when control bar 41' moves outwardly from pipe P, pin 96 will engage wire 83 to move the wire against pins 97' and 98' and upon further outward movement will pull wire 83 between pins 97' and 98', again shortening the effective length of wire 83 and actuating safety shutoff valve V. To prevent wire 83 from accidentally slipping beneath the ends of pins 96 and 96', the latter may extend through a slot 100 in bracket 99 and also may be provided with a head disposed on the underside of the bracket. Also, the end of bar 41' may be disposed beneath wire 83 and a plate attached to the tops of pins 97, 97' and 98, 98', which plate may also be provided with a slot to accommodate movement of pins 96, 96', again to prevent wire 83 from slipping off the pins accidentally. It will be understood, of course, that any other suitable arrangement for shortening the effective length of wire 83 upon undue movement of control bar 41 or 41' in either direction may be used.

Figures 16, 20, 21:
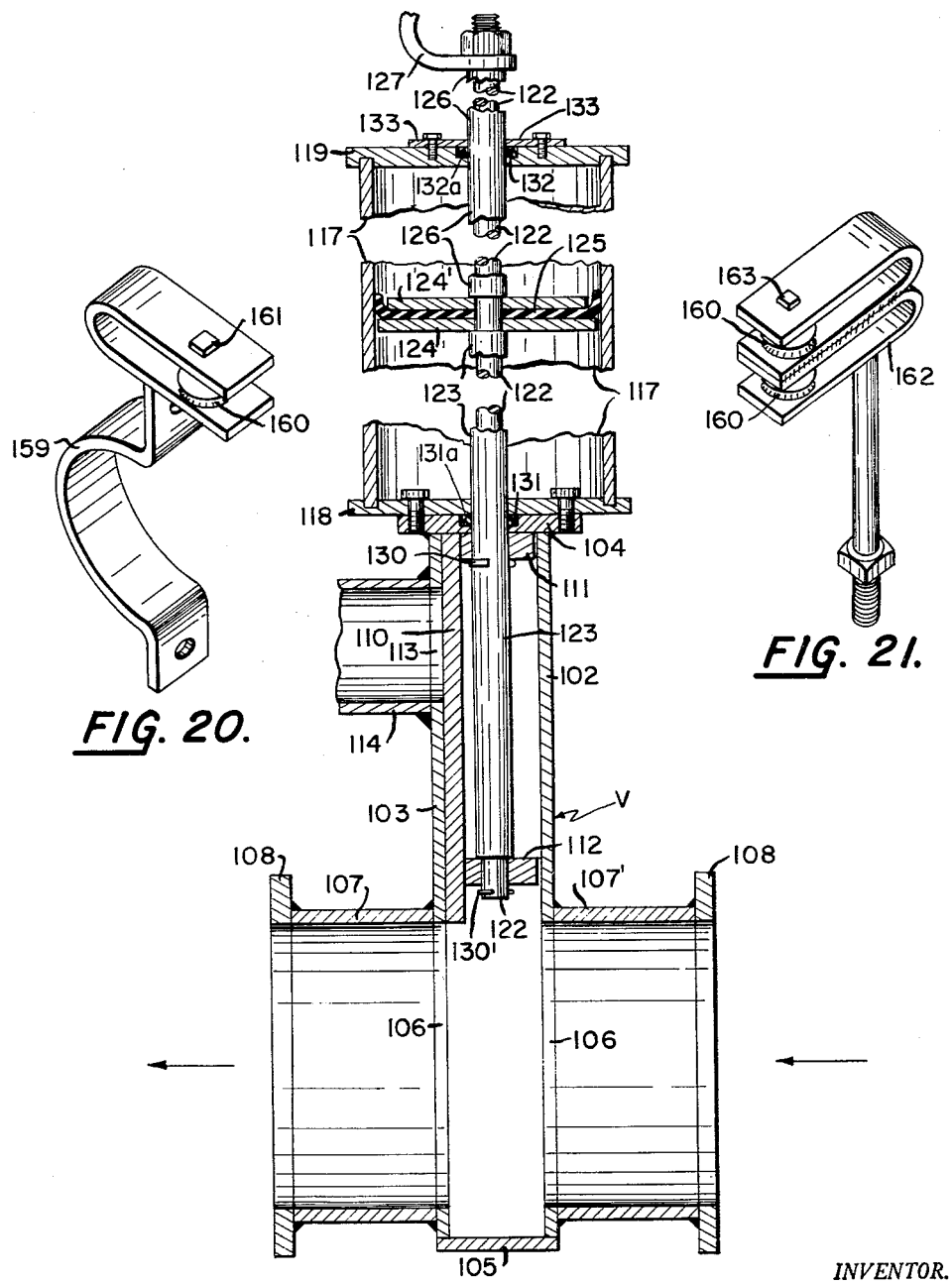
FIG. 16 is a vertical section, on an enlarged scale, of the shutoff valve of FIG. 15, taken longitudinally of the distributing pipe.
FIG. 20 is an enlarged perspective view of a wire roller and bracket utilized in the arrangement of FIG. 19.
FIG. 21 is an enlarged perspective view of a bracket provided with dual wire rollers and utilized in the arrangement of FIG. 19.
Figure 22:
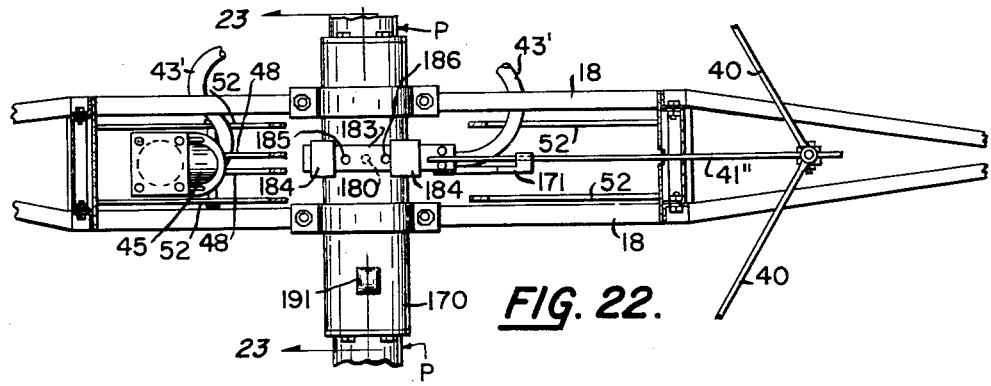
FIG. 22 is a fragmentary top plan view, at one support, of an alternative control andd safety arrangement which may include a distributing pipe safety shutoff valve installed at each support or wheeled carriage.

As illustrated in FIGS. 15 and 16, the safety shutoff valve V may be a relatively simple constructed gate valve which need not form a complete seal when closed, since substantial closure only is necessary to terminate the flow of water through the pipe P sufficiently to raise the pressure at the pump and shut off the pump motor. Thus, the valve V may include a box-shaped housing having sides 102 and 103, a top 104 and end and bottom strips 105 to complete the enclosure, these parts being conveniently welded together. Sides 102 and 103 may each be provided with a circular opening 106 adjacent the lower end thereof, around which short lengths of piping 107 and 107' may be attached, as by welding, the latter being conveniently provided with flanges 108 at their outer ends for attachment to mating flanges 108' of pipe P and L 36, as in FIGS. 3 and 15. A gate 110 adapted to move upwardly and downwardly adjacent side 103 is adapted to close the opening in side 103 when moved downwardly, being held against side 103 by the pressure of water supplied to pipe P, which flows in the direction of the arrows of FIG. 16. Gate 110 may be provided with flanges 111 and 112 connected thereto, as by welding, adjacent the upper and lower ends thereof, with a slight clearance between the extending ends of flanges 111 and 112 and the side 102, as in FIG. 16, so that when gate 110 is in the up position, sufficient leakage around the gate 110 will occur to supply water through a hole 113 in side 103 to fill a pipe 114. This water may be used to close the valve V by flow through a valve 115 of FIG. 15, when open, and tubes 116 and 116' to the upper end of a cylinder 117. Cylinder 117 may be a section of tubing of appropriate length, the lower end of which fits into a circular groove in a bottom plate 118 attached to top 104 of valve V, as by interior bolts, as shown, and the upper end of which fits into a similar circular groove in a top plate 119. The cylinder top and bottom plates may be drawn together by rods 120, extending between the corners of the plates.

A piston rod 122 may extend completely through cylinder 117 and also through the gate flanges 111 and 112, while a sleeve 123 may extend from the lower gate flange 112, through the upper gate flange 111 and within cylinder 117 to the underside of a piston assembly conveniently formed by a pair of plates 124 and 124', adapted to clamp therebetween a packing ring 125 formed of neoprene, rubber, leather or any other suitable material and conveniently having an upturned edge engaging the inside of cylinder 117 to prevent leakage when water is supplied to the upper end of the cylinder and the piston is moved downwardly to close gate 110. Above the piston, a sleeve 126 may surround rod 122 and extend through the top plate 119 for engagement with a bracket 127, the upper end of rod 122 conveniently being threaded for attachment by a nut thereto so as to clamp bracket 127 against the upper end of sleeve 126. The upper end of bracket 127, as in FIG. 15, may be attached to a coil spring 128, suspended by a two-legged bracket 129 mounted on cylinder top plate 119. Gate 110 of valve V is normally held in an upper position, as shown in FIG. 16, by coil spring 128, which also moves gate 110 upwardly when water pressure above the piston is released, as in the manner described below. It will be noted that, in the position of the parts shown in FIG. 15, gate 110 is closed, although the normal position of the gate will be the up position of FIG. 16 and in such position, the spring 128 will be considerably shorter than shown in FIG. 15, with the piston rod and bracket 127 disposed above cylinder top plate 119 a distance corresponding to the difference in elevation of the valve gate 110 between the upper and lower, or open and closed, positions.

Attachment of rod 122 to bracket 127 also clamps the piston assembly between sleeves 123 and 126 and also clamps the lower end of sleeve 123 against the top of gate flange 112, the piston rod and sleeve being prevented from moving out of the flanges 111 and 112 in any suitable manner, as by a relatively heavy cotter pin 130 extending through piston rod 122 and sleeve 123 below flange 111 and a similar heavy cotter pin 130' extending through piston rod 122 below lower flange 112. A packing ring 131 may be disposed around sleeve 123 within a groove 131a provided for that purpose in the top 104 of the valve V and held in position by cylinder bottom plate 118, while a packing ring 132 may surround sleeve 126 within a groove 132a provided for the purpose in cylinder top plate 118 and may be held in position by a cover plate 133.

As illustrated in FIG. 15, the inlet of valve 115 may be connected to a reduced end 135 of pipe section 114 and its outlet to an L 136, in which may be incorporated a flow control orifice 137 of FIG. 17, conveniently formed in a plug 138 installed in a reducing fitting 139 connecting L 136 with tube 116. The orifice 137 reduces the flow of water to the upper end of cylinder 117 when valve 115 is opened, so as to cause the gate 110 to close relatively slowly and permit an opportunity for the automatic control device at the support or supports involved to correct a temporary undue misalignment, possible due to one or more supports moving comparatively rapidly down an incline or slowly up an incline, before the apparatus is completely stopped. Also, a T 140 may be installed between tubes 116 and 116' and, as illustrated in FIG. 18, provided with a plug 141 having a relatively small bleed orifice 142 which is adapted to bleed air out of the cylinder when water is being supplied thereto and also to permit the water to be discharged slowly from the upper portion of the cylinder and permit spring 128 to lift gate 110 back to its upper position again in the event that the undue misalignment is corrected before gate 110 closes completely and valve 115 is therefore closed before the pump has been stopped. This again provides an additional opportunity for the control devices of the respective supports to correct the misalignment. In general, the size of the bleed orifice 142 is preferably considerably smaller than the flow control orifice 137, the size of the former being 1/16 in., for instance, when the latter is 1/8 in. Of course, the dimensions of these orifices may be varied considerably in accordance with the speed with which valve V is to be closed.

As illustrated in FIG. 15, wire 83 may be connected to a turnbuckle 144, in turn connected to a cam bar 145 having a cam surface 146 adapted to engage the operating stem 147 of valve 115, the valve 115 again preferably being a type of valve in which stem 147 is pushed inwardly to open the valve, and provided with an interior spring or other resilient means so that the stem 147 will normally be maintained in an outer position and the valve will remain closed. The cam surface 146 may have a configuration such that valve 115 will be opened only after a predetermined movement of the inner end of wire 83 and also will open valve 115 in the event that wire 83 breaks, for instance, and tension on cam bar 145 is released. Cam bar 145 may move within a guide 148 attached to valve 115 and may also be provided with a bar 149 to which a pair of coil springs 150 may be attached, springs 150 being partly broken away in FIG. 15 for clarity of illustration. The opposite ends of the springs 150 may be connected to a bar 151, which is preferably adjustable to adjust the tension of springs 150, as by an eye bolt 152 connected to and adjustable on an angle bracket 153 mounted on the body of valve V. As will be evident, the total effective length of wire 83 may be adjusted by turnbuckle 144, while in the event wire 83 breaks, the springs 150 will pull the cam bar 145 toward valve V, thus opening valve 115 to close valve V. It will be understood, of course, that any other suitable arrangement for actuating valve 115 may be used.

Shutoff valve V may also be controlled in other ways, such as indicated diagrammatically in FIG. 19, in which a control wire 155, indicated by a full line and which may be connected to valve V in a manner similar to wire 83, as in FIG. 15, extends from a point on pipe P adjacent valve V to one side of the adjacent support S, then to the opposite side of the next outer support, and alternating from one side of one support to the opposite side of the next outer support, until the outermost support is reached, at which the outer end of wire 155 may be fixed. If desired, a second control wire 156, shown as a dotted line, may be fixed to pipe P adjacent valve V, then extend to the rear side of the innermost support S, then to pipe P and alternately to the rear side of the next outer support and the pipe P, the outer end of wire 156 being attached to a shutoff valve 157 normally held open by a spring 158 and incorporated in the line supplying water to the water motor for the outermost support S. A bracket 159, as shown also in FIG. 20, provided with a grooved roller 160, rotatable about a pin 161 and engaged by wire 156, may be clamped to pipe P at appropriate positions. A dual bracket 162, as shown also in FIG. 21, provided with a pair of grooved rollers 160 rotatable about a pin 163, may be mounted on a plate 164 at the side of each support S at which either wire 155 or both wires 155 and 156 extend to and from that side of the support. For convenience, a plate 164 may be provided at each side of each support so that wires 155 and 156 may be connected in any desired arrangement, as in FIG. 7. A cam bar or other suitable device adapted to open a valve, such as similar to valve 115 of FIG. 15, which permits water to be supplied to a cylinder or the like for closing valve V, may be connected to the inner end of wire 155 so that either a shortening or a lengthening of the wire 155, of a predetermined extent, will close the safety shutoff valve V and cause the apparatus to be stopped. As will be evident, if one or more of the supports S become unduly out of line with respect to adjacent supports, the effective length of wire 155 will be increased, thus closing valve V and stopping the apparatus. Control wire 156 may be considered to be a safety wire which will stop the outermost support S, in the event of failure of valve V to be closed. As will be evident, undue misalignment of one or more intermediate supports will shorten the effective length of wire 156 and shut off the valve 157. Wire 155 will be responsive to the condition when the outermost support S runs ahead of the other supports so that pipe P tends to be moved to a concave position, with respect to the direction of movement, as well as when the inner supports S run ahead of the outer support, so that pipe P is moved to a convex position. However, wire 156 will be responsive only to the concave condition, since the convex condition will lengthen, rather than decrease, the effective length of the wire 156.

In the embodiment illustrated in FIGS. 22–25, a larger pipe section 170 may be placed at each of the supports S except the outermost, with the framework or tower, including the beams 18, being similar to the previous embodiment, or constructed in any other suitable manner. The water motor cylinder 45 and the drive parts therefrom may also be similar to the embodiment previously described or constructed in any other suitable manner, while a host 43' may lead from a water motor control valve 42' shown in FIG. 24, to the water motor. Valve 42' may be a plug type valve, controlled by a lever 171 attached to a control bar 41", the outer end of which may be connected to rod 40, the latter being attached to pipe P at each side of the respective supports, as in the manner previously described. Valve 42' may be mounted on an inlet connection 172, leading from pipe section 170. The entire apparatus also may be supplied with water by a pump having associated therewith a pressure responsive device adapted to shut off the pump whenever the pressure exceeds a predetermined amount, such as described previously in connection with FIG. 10.

In each of the larger pipe sections 170, a flap valve 173 may be installed which is normally held in an open position, but is adapted to be closed whenever the control bar 41" is moved more than a predetermined distance in either direction, due to the swinging or bending of the pipe at the respective support S. Such a flap valve may include a plate which is pivoted by a pair of ears 174, adjacent its upper end, on a pin 175 extending transversely in the pipe section 170 adjacent the top thereof.

Figure 23:
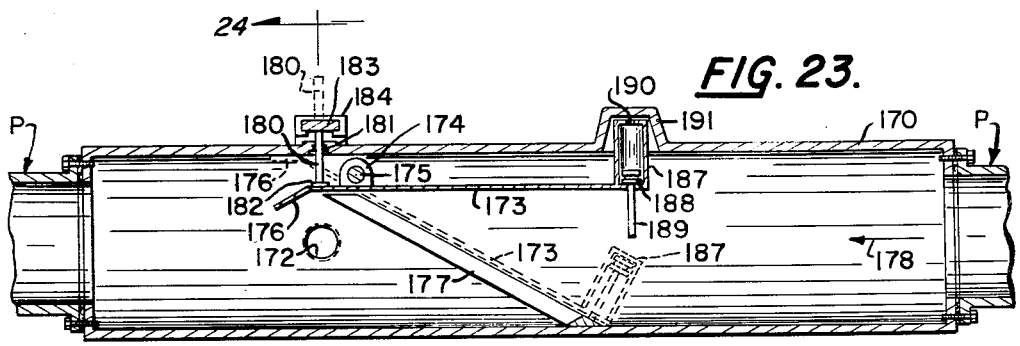
FIG. 23 is an enlarged vertical section, taken along line 23—23 of FIG. 22.
Figures 24, 25:
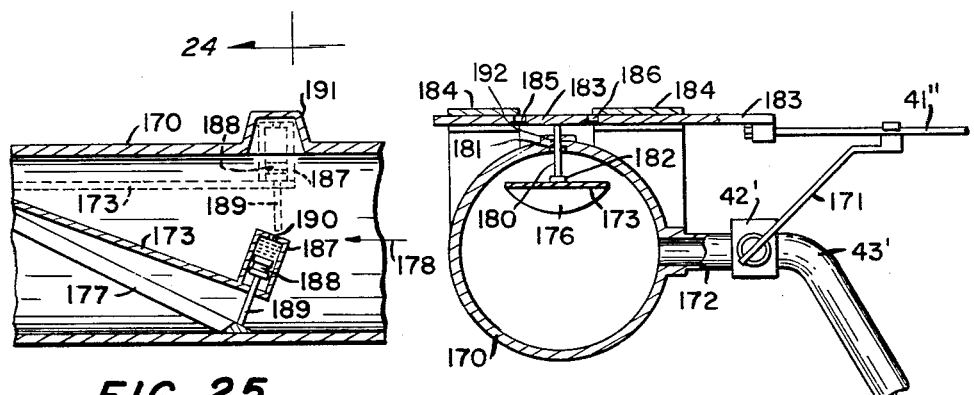
FIG. 24 is a transverse vertical section, taken along line 24—24 of FIG. 23.
FIG. 25 is a fragmentary longitudinal section similar to a portion of FIG. 23, but illustrating a different position of the safety shutoff valve.

The upper end 176 of plate 173 may be angled slightly so as to fit against the upper surface of the pipe section 170, when in down position, while plate 173, including the upper end 176, may be oval in shape to correspond generally to the configuration of the inside of pipe 170 when the plate 173 is in the down or closed position, shown in dotted lines in FIG. 23. While plate 173 may conform generally to the shape of an oblique section of pipe section 170, corresponding to the down position, it is preferably slightly smaller transversely, from the position of ears 174 to the lower end thereof, so as to be more readily accommodated in the upper position shown in full in FIG. 23. So that the plate 173 will close the pipe section 170 when in the down position, a strip 178 may be attached to the inside of the pipe section 170 and extend downwardly from the position of ears 174 along each side and around the lower inner surface of the pipe section. As will be evident, when plate 173 moves to the dotted position of FIG. 23, the edges thereof will seal against strip 177, and upper end 176 will engage the inside of the upper portion of pipe section 170.

As will be evident, in the full line position of FIG. 23, plate 173 is in open position, so that the water may flow through the pipe P in the direction of the arrow 178. However, whenever the plate 173 is released, as in the manner described below, it will move downwardly to the dotted or closed position of FIG. 23, in which it stops flow through the pipe P past the support involved. This stoppage of flow, at any support at which undue misalignment occurs, will cause the pressure to rise at the pump, in the manner described previously, and thereby stop the pump and the apparatus. The plate 173 may normally be held in its upper or open position by a pin 180, as in FIGS. 23 and 24, which extends through an opening 181 in the pipe and may be sealed by a suitable gasket, such as an O-ring 192. Pin 180 may also be provided with a footing 182, adapted to engage the upper surface of plate 173, while the pin may be retained in its down position by a slide 183 adapted to be moved inwardly and outwardly in guides 184, mounted on pipe section 170, by control bar 41". Slide 183 as in FIGS. 22 and 24, may be provided with a pair of holes 185 and 186 which, whenever the slide 183 is moved in either direction so that one or the other of the holes 185 or 186 coincides with the position of pin 180, the pin will be permitted to pop upwardly to the dotted position of FIG. 23, thereby permitting plate 173 to move downwardly. As will be evident, such movement of slide 183 will occur when bar 41" is moved inwardly or outwardly, toward or away from pipe section 170, an amount corresponding to undue misalignment of the support S involved.

To prevent the plate 173 from moving downwardly too suddenly thereby causing a pressure surge in the pipe P, a dash-pot cylinder 187 may be mounted on the lower end thereof, provided with a piston 188 having a pin 189 depending therefrom, which will normally, due to the weight of the piston 188, extend through the lower side of the plate 173 and hang in this position during normal flow through the pipe P and the respective pipe section 170. However, when the slide 183 permits the pin 180 to pop up, as to the dotted position of FIG. 23, the plate 173 will be free to move downwardly to the full line position of FIG. 25, in which the pin 189 will engage the strip 177 at its lower edge and the piston 188 will begin to force water through a bleed hole 190 in the top of dash pot cylinder 187. Of course, water flowing in the direction of the arrow 178 of FIG. 25 will tend to force the plate 173 to closed position, but the closing movement will be delayed while piston 188 forces the water in cylinder 187 out through the bleed hole 190. Thus, the plate 173 will close slowly between the full position of FIG. 25 and the closed position, shown in dotted lines in FIG. 23. In this way, a sudden reverse pressure surge, which might produce water hammer or a similar consequence, may be avoided. In order to accommodate the dash pot cylinder 187 when plate 173 is in the upper or full position of FIG. 23, pipe section 170 may be provided with a boss 191 extending upwardly therefrom.

From the foregoing, it will be evident that the self-propelled sprinkling irrigation apparatus of this invention fulfills to a marked degree the requirements and objects hereinbefore set forth. By providing suitable valve means, such as a gate valve installed at the inner end of the main pipe and control means for closing the gate valve, or individual valves, such as flap valves, at each support excepting the outermost, and means for closing the valve or each of the valves whenever undue misalignment of the supply pipe occurs, damage to the apparatus can be avoided in the event that the misalignment is sufficiently great that normal control of the speed of the individual supports will not readily overcome the same. As will be evident, such control devices may exist in several different forms, as described hereinbefore. Such control valves for stopping the flow of water in the pipe whenever undue misalignment occurs, of course, cooperate with a pressure responsive device at the pump, which is adapted to shut down the pump whenever the pressure rises above a predetermined maximum, due to the closing of the valve or valves installed in the main pipe. In addition, if desired, the apparatus may be stopped in the event of undue misalignment by stopping the drive means for the outermost support, the speed of which is normally set at a desired value. As will also be evident, by using a reciprocating linkage, including an arm adapted to move the drive wheels in one direction and to be moved back into position for the next stroke, and a heavy spring to return the linkage to starting position, more effective operation of the drive between a water motor and the supporting wheels is assured.

As will be evident, numerous additional elements of the various parts of the apparatus described comprise novel features or novel combinations of features.

Although certain embodiments of this invention have been illustrated and described, it will be evident that other embodiments may exist and that various changes may be made, all without departing from the spirit and scope of this invention.

What is claimed is:

1. In self-propelled sprinkling and irrigation apparatus for a relatively large section of land or the like, which includes a distributing pipe movable along a predetermined path on said land section; means for supplying water to said distributing pipe; a plurality of supports disposed in spaced position along said distributing pipe and each extending both forwardly and rearwardly of said distributing pipe; a plurality of discharge nozzles spaced along said distributing pipe for spraying water onto the land as the said distributing pipe moves; drive means at each support; a control device at each intermediate support and adapted to cause said drive means at said support to move said support slower or faster in accordance with the movement of said intermediate support ahead or behind an adjacent support; control means for said drive means at the outermost support for causing said drive means to operate continuously at a predetermined rate of movement of said outermost support; the improvement which comprises a valve in said pipe adjacent the inlet end thereof for substantially terminating flow through said pipe beyond said valve; means for actuating said valve to close the same; a control wire connected at its inner end to said valve actuating means, said control wire extending from the one end of said outermost support to the opposite end of the next inner support and alternately to the forward and rearward ends of successive supports inwardly along said distribuiting pipe; and means mounted on the respective forward and inner ends of the intermediate supports for permitting relative movement of said control wire with respect thereto.

2. In self-propelled sprinkling and irrigation apparatus for a relatively large section of land or the like, which includes a distributing pipe movable along a predetermined path on said land section; means for supplying water to said distributing pipe; a plurality of supports disposed in spaced position along said distributing pipe and each extending both forwardly and rearwardly of said distributing pipe; drive means at each support; a plurality of discharge nozzles spaced along said distributing pipe for spraying water onto the land as the said distributing pipe moves; a control device at each intermediate support and adapted to cause said drive means at said support to move said support slower or faster in accordance with the movement of said intermediate support ahead or behind an adjacent support; and control means for said drive means at the outermost support for causing said drive means to operate continuously at a predetermined rate of movement of said outermost support, the improvement comprising means for terminating operation of said drive means at said outermost support; a control wire for actuating said means for stopping said outermost support drive means, said control wire extending from the forward end of said outermost support to the rearward end of the next inner support, thence to said distributing pipe and to the rearward end of the next inner support and similarly from the rearward end of one support thence to said distributing pipe and to the rearward end of the next inner support, inwardly along said distributing pipe, the inner end of said control wire being attached to said distributing pipe adjacent the inlet end thereof; and means mounted on said distributing pipe and the rearward end of each intermediate support for permitting relative movement of said control wire with respect thereto.

3. In self-propelled sprinkling and irrigation apparatus for a relatively large section of land or the like, which includes a distributing pipe movable along a predetermined path on said land section; means for supplying water to said distributing pipe; a plurality of discharge nozzles spaced along said distributing pipe for spraying water onto the land as said distributing pipe moves; and drive means for moving said pipe along said path, the improvement comprising a plurality of towers for supporting said pipe and disposed at spaced positions along said distributing pipe, said towers extending above said pipe a substantial distance in comparison to the distance from said pipe to the land; a series of cables extending between the upper ends of adjacent towers; and resilient means associated with each said cable to permit the upper ends of adjacent towers to move toward each other and apart as said towers move over an irregularity in said land.

4. In self-propelled sprinkling and irrigation apparatus, as defined in claim 3, including a second series of cables each extending from a point adjacent the upper end of each of a plurality of towers to a point of connection to said distributing pipe spaced laterally from the respective tower and at each side thereof, said second series of cables thereby supporting said distributing pipe at positions intermediate said toweres; and resilient means associated with said second series of cables to permit increases and decreases in the distance between the point of attachment of the cable to the said distributing pipe and the respective tower, so as to permit the tops of adjacent towers to move toward each other and apart as said towers move over an irregularity in said land.

5. In self-propelled sprinkling and irrigation apparatus for a relatively large section of land or the like, which includes a distributing pipe movable along a predetermined path on said land section; means for supplying water to said distributing pipe; a plurality of discharge nozzles spaced along said distributing pipe for spraying water onto the land as said distributing pipe moves; and drive means for moving said pipe along said path, the improvement comprising a plurality of towers for supporting said pipe and disposed at spaced positions along said distributing pipe, said towers extending above said pipe a substantial distance in comparison to the distance from said pipe to the land; a series of cables each extending from a point adjacent the upper end of each of a plurality of towers to a point of connection to said distributing pipe spaced laterally from the respective tower and at each side thereof, said cables thereby supporting said distributing pipe at positions intermediate said towers; and resilient means associated with said cables to permit increases and decreases in the distance between the point of attachment of a cable to the said distributing pipe and the respective tower, so as to permit the tops of adjacent towers to move toward each other and apart as said towers move over an irregularity in said land.

6. In self-propelled sprinkling and irrigation apparatus for a relatively large section of land, which includes a distributing pipe movable along a predetermined path on said land section; means for supplying water to said distributing pipe; a plurality of supports having wheels and disposed in spaced positions along said distributing pipe; a plurality of discharge nozzles spaced along said distributing pipe for spraying water onto the land as said distributing pipe moves; and reciprocating drive means at each said support, the improvement comprising a series of projections on said wheels and spaced radially therearound; a generally horizontally reciprocable bar provided with means for engaging said projections in turn and moving the said wheels when said bar is moved in one direction and slipping over said projections when said bar is moved in the opposite direction; means connecting said drive means with said bar for moving said bar positively from said drive means in the direction in which said wheels are driven; and resilient means urging said bar in its movement in the opposite direction.

7. In self-propelled sprinkling and irrigation apparatus, as defined in claim 6, wherein each said support is provided with two wheels and said bar is upturned at each end and provided with a shoulder spaced from said forward end and a notch spaced from said rearward end, said shoulder engaging said projections on one said wheel to drive the same, and one end of said notch engaging said projections on the opposite wheel to drive the same.

8. In self-propelled sprinkling and irrigation apparatus, as defined in claim 6, wherein said means connecting said drive means with said bar includes a linkage system; and said resilient means includes a spring extending between one of said links and a structural element of said support.

9. In self-propelled sprinkling and irrigation apparatus as defined in claim 6, wherein said drive means comprises a generally upright piston rod and a piston, and a cylinder enclosing said piston and adapted to be moved upwardly by pressure of fluid between said piston and the upper end of said cylinder; and means for supplying water to said cylinder from said distributing pipe, including valve means for controlling the flow of water to said cylinder and the discharge of water from said cylinder, said resilient means being constructed and arranged to assist movement of said bar as said cylinder moves downwardly while water is being discharged therefrom.

10. In self-propelled sprinkling and irrigation apparatus for a relatively large section of land or the like, which includes a distributing pipe movable along a predetermined path on said land section; means for supplying water to said distributing pipe; a plurality of supports disposed in spaced position along said distributing pipe; a plurality of discharge nozzles spaced along said distributing pipe for spraying water onto the land as said distributing pipe moves; drive means at said supports; and a control device at each of a plurality of intermediate supports responsive to movement of the respective intermediate support ahead or behind another support, the improvement which comprises a gate type valve having an upright rod and mounted in said distributing pipe adjacent the inlet end thereof, for substantially terminating flow through said pipe beyond said valve; a cylinder enclosing a piston mounted on said rod and disposed above said valve, said rod extending through the upper end of said cylinder; means for supplying water from said distributing pipe to the upper end of said cylinder for closing said valve; resilient means disposed above said cylinder and connected to the upper end of said rod for urging said rod upwardly; and means for controlling the supply of water to the upper end of said cylinder, said last mentioned control means being associated with means actuated by said control devices so as to supply water to the upper end of said cylinder upon movement of an intermediate support relative to another support greater than a predetermined extent.

11. In self-propelled sprinkling and irrigation apparatus, as defined in claim 10, wherein said valve is provided with a gate having laterally extending flanges, said valve having a housing enclosing said gate; a lower sleeve surrounding said rod and abutting against the lowermost of said flanges and extending through the remainder of said flanges into said cylinder and to the bottom of said piston; an upper sleeve surrounding said rod and abutting the upper end of said piston and extending through the upper end of said cylinder; a pipe connected with the interior of said housing and having a diameter sufficient to act as a reservoir for water to be supplied to the upper end of said cylinder; a valve connected to the outer end of said last-mentioned pipe and having a stem which is pushed inwardly to open said valve; a longitudinally movable control bar having a cam surface for pushing said valve stem inwardly when moved a predetermined extent in either direction; spring means for pulling said control bar toward said gate valve; and a water line extending from the outlet of said second-mentioned valve to the upper end of said cylinder and having therein a flow orifice and a bleed orifice, said bleed orifice being adjacent the upper end of said cylinder so as to permit the discharge of air while water is supplied to the upper end of said cylinder and to permit the discharge of water when said resilient means connected to said rod moves said piston and said gate upwardly.

12. In self-propelled sprinkling and irrigation apparatus for a relatively large section of land or the like, which including a distributing pipe movable along a predetermined path on said land section; means for supplying water to said distributing pipe; a plurality of supports disposed in spaced position along said distributing pipe; a plurality of discharge nozzles spaced along said distributing pipe for spraying water onto the land as said distributing pipe moves; drive means at said supports; and a control device at each of a plurality of intermediate supports responsive to movement of the respective intermediate support ahead or behind another support, the improvement which comprises a plate valve within said distributing pipe at each said intermediate support and pivoted adjacent one end therein, said plate valve being movable downwardly to substantially close said pipe against the flow of water beyond said plate valve; a dash pot associated with each said plate valve and adapted to impede the closing movement of said plate valve as it approaches closed position; and means actuated by said control device for causing said valve at each respective support to close upon movement of said intermediate support relative to another support greater than a predetermined extent.

13. In self-propelled sprinkling and irrigation apparatus, as defined in claim 12, including a slide at each said intermediate support and connected with said control device; a pin extending downwardly through said distributing pipe and engaging the underside of said slide, said slide having apertures therein permitting said pin to move upwardly upon movement of said slide in either direction to a predetermined extent and the lower end of said pin being engageable with said plate valve adjacent the pivot point thereof to hold said plate valve in its normal upper position; the edge of said plate valve being generally oval in shape to conform generally to the interior of said distributing pipe when said plate valve moves downwardly and the rear end of said plate valve being disposed angularly; said distributing pipe being provided with a ledge extending obliquely and downwardly from a point adjacent the pivot point of said plate valve, said ledge being engageable by the edges of said plate valve when in closed position; and said dash pot being mounted on the extended end of said plate valve and including a pin normally depending from said plate valve, a cylinder extending upwardly from said plate valve and provided with an orifice in the otherwise closed top thereof, and a piston within said cylinder and connected to the upper end of said dash pot pin.

14. In self-propelled sprinkling and irrigation apparatus for a relatively large section of land or the like, which includes a distributing pipe movable along a predetermined path on said land section; means for supplying water to said distributing pipe; a plurality of supports disposed in spaced position along said distributing pipe; a plurality of discharge nozzles spaced along said distributing pipe for spraying water onto the land as said distributing pipe moves; water actuated drive means at said supports; and a control device at each intermediate support responsive to movement of said intermediate support ahead or behind another support, the improvement which comprises a valve control bar movable longitudinally thereof by said control device at each intermediate support; brackets mounted on the respective support and provided with rollers extending therebetween, both above and below said control bar, for guiding said control bar during longitudinal movement thereof; a valve at each said intermediate support for controlling the flow of water to said drive means and provided with a stem pushed inwardly to open said valve; and a pivoted member having means for engaging said valve stem and a cam roller spaced therefrom, said control bar having a cam surface in engagement with said cam roller.

15. In self-propelled sprinkling and irrigation apparatus for a relatively large section of land or the like, which includes a distributing pipe movable along a predetermined path on said land section; means for supplying water to said distributing pipe; a plurality of supports disposed in spaced position along said distributing pipe; a plurality of discharge nozzles spaced along said distributing pipe for spraying water onto the land as said distributing pipe moves; drive means at said supports; a control device at each of a plurality of intermediate supports responsive to movement of the respective intermediate support ahead or behind another support, the improvement which comprises a valve mounted in said distributing pipe adjacent the inner end thereof for substantially terminating flow through said pipe; control means for actuating said valve; a control wire extending longitudinally of said pipe and connected at one end to said valve control means and fixed at its opposite end in a stationary position relative to said distributing pipe; a bar movable transversely relative to said distributing pipe at each said intermediate support and movable by the respective control device; and means operable by said bar for shortening the effective length of said control wire upon movement of said control bar a predetermined distance in either direction.

16. In self-propelled sprinkling and irrigation apparatus, as defined in claim 15, wherein said means for shortening the effective length of said control wire comprises a pair of links pivotally connected to said control bar on opposite sides thereof, each said link having a slot therein adjacent its outer end, with the slot in one link being displaced with respect to the slot in the opposite link, in a direction longitudinally with respect to said control bar; a T-bar having a head, laterally extending arms and a longitudinally extending leg, each said arm being provided with a pin extending through the slot in one of said links and said T-bar being pivoted at its head and at a fixed point relative to said distributing pipe; and a clamp attached to said control wire and pivoted to the extended end of said T-bar leg.

17. In self-propelled sprinkling and irrigation apparatus, as defined in claim 15, wherein said means for shortening the effective length of said control wire comprises a control bar movable transversely of said pipe by said control device; a pair of pins extending in spaced positions from the end of said control bar opposite said control device for engagement with said control wire; a pair of pins on each side of said end of said control bar and also disposed on each side of said control wire; and means attached to said distributing pipe for mounting said last-mentioned pairs of pins, so that movement of said control bar a predetermined distance in one direction will cause one of said bar pins to engage said control wire and pull said control wire between two of said mounted pins, while movement of said control bar in the opposite direction a predetermined distance will cause the opposite bar pin to engage said control wire and push said wire between the opposite mounted pins.

18. In self-propelled sprinkling and irrigation apparatus for a relatively large section of land or the like, which includes a distributing pipe movable along a predetermined path on said land section; means for supplying water to said distributing pipe; a plurality of discharge nozzles spaced along said distributing pipe for spraying water onto the land as said distributing pipe moves; and drive means for moving said pipe along said path, the improvement comprising a plurality of towers for supporting said pipe and disposed at spaced positions along said distributing pipe, said towers extending above said pipe a substantial distance in comparison to the distance from said pipe to the land and also forwardly and rearwardly of said distributing pipe; a series of cables extending between the upper ends of adjacent towers; resilient means associated with each said cable to permit the upper ends of adjacent towers to move toward each other and apart as said towers move over an irregularity in said land; a second series of cables each extending from a point adjacent the upper end of a tower to a point of connection to said distributing pipe spaced laterally from the respective tower and at each side thereof, said second series of cables thereby supporting said distributing pipe at positions intermediate said towers; resilient means associated with said second series of cables to permit increases and decreases in the distance between the point of attachment of the cable to the said distributing pipe and the respective tower, so as to permit the tops of adjacent towers to move toward each other and apart as said towers move over an irregularity in said land; a plurality of cross braces extending laterally to each side of said distributing pipe at longitudinally spaced points between each pair of adjacent towers; a wire extending from the forward end of each support to the forward end of each of the adjacent cross braces inwardly therefrom in turn and then inwardly to the center of the next inner tower; a wire extending from the rearward end of each support to the rear ends of the adjacent cross braces inwardly therefrom in turn and then inwardly to the center of the next inner tower; wires extending from the center of one tower to the forward and rear ends, respectively, of the adjacent cross brace inwardly therefrom and thence inwardly to the center of the next inner tower; a clamp having a depending flange mounted on said distributing pipe between two of said cross braces; and a rod disposed on the under side of said pipe and attached to said pipe at the position of said two cross braces and engaging said clamp flange beneath said distributing pipe.

19. In self-propelled sprinkling and irrigation apparatus for a relatively large section of land or the like, which includes a distributing pipe movable along a predetermined path on said land section; means including a pump for supplying water to said distributing pipe; a plurality of supports disposed in spaced position along said distributing pipe; a plurality of discharge nozzles spaced along said distributing pipe for spraying water onto the land as said distributing pipe moves; drive means at said supports; and a control device at an intermediate support responsive to movement of said intermediate support ahead or behind another support, the improvement which comprises valve means for substantially terminating flow through said pipe beyond said valve means; means actuated by said control device for closing said valve means upon movement of said intermediate support relative to another support greater than a predetermined extent; means responsive to the pressure at the discharge side of said pump; and means controlled by said responsive means for stopping said pump when said pressure increases to exceed to a predetermined extent the normal pressure at the discharge side of said pump, said normal pressure occurring when water flows through substantially the length of said distributing pipe and such increase in pressure to such predetermined extent being indicative of closing of said valve means.

20. In self-propelled sprinkling and irrigation apparatus for a relatively large section of land or the like, which includes a distributing pipe movable along a predetermined path on said land section; means for supplying water to said distributing pipe; a plurality of supports disposed in spaced relation along said distributing pipe; a plurality of discharge nozzles spaced along said distributing pipe for spraying water onto the land as said distributing pipe moves; drive means at said support; and a control device at each intermediate support responsive to movement of said intermediate support ahead or behind another support, the improvement which comprises valve means for substantially terminating flow through said pipe beyond said valve means, said valve means including a valve at each intermediate support at which a control device is located; and means actuated by said control device for closing said valve means upon movement of said intermediate support relative to another support greater than a predetermined extent.

21. In self-propelled sprinkling and irrigation apparatus, as defined in claim 20, wherein each said valve is disposed within said distributing pipe.

22. In a self-propelled sprinkling and irrigation apparatus, which includes a movable distributing pipe having means for spraying water, a plurality of supports for said pipe and having drive means, and a control device at an intermediate support responsive to movement of said intermediate support ahead or behind another support, the improvement comprising means for terminating operation of said drive means at said supports and actuated by said control device upon movement of said intermediate support greater than a predetermined extent ahead or behind another support; and means for delaying the operation of said terminating means.

23. In a self-propelled sprinkling and irrigation apparatus, as defined in claim 22, wherein said drive means at said supports are actuated by water supplied from said distributing pipe; and said terminating means includes a valve for substantially terminating flow of water through said pipe to said drive means.

24. In a self-propelled sprinkling and irrigation apparatus, as defined in claim 23, wherein said valve is fluid operated; and said delaying means includes a bleed orifice through which fluid flows to operate said valve.

25. In a self-propelled sprinkling and irrigation apparatus, as defined in claim 22, including a plurality of intermediate supports; a central device at each intermediate support responsive to movement of said intermediate support ahead of or behind another support, and means controlling the speed of said drive means at the respective intermediate supports and operatively connected with the control device thereof to cause said drive means thereof to decrease or increase in speed when said intermediate support moves ahead or behind another support.

References Cited in the file of this patent

UNITED STATES PATENTS

| | | |
|---|---|---|
| 2,604,359 | Zybach | July 22, 1952 |
| 2,726,895 | Behlen | Dec. 13, 1955 |
| 2,730,403 | Huntley | Jan. 15, 1956 |
| 2,893,643 | Gordon | July 7, 1959 |
| 2,941,727 | Zybach | June 21, 1960 |